Oct. 26, 1954     J. A. JENSEN     2,692,617
SELECTIVE VALVE CONTROL MECHANISM
Filed June 13, 1950     3 Sheets-Sheet 1
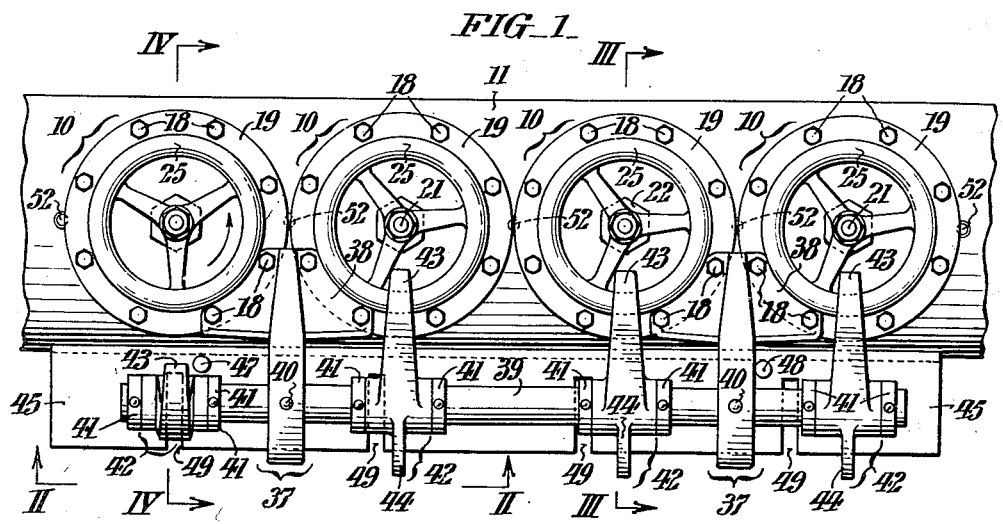
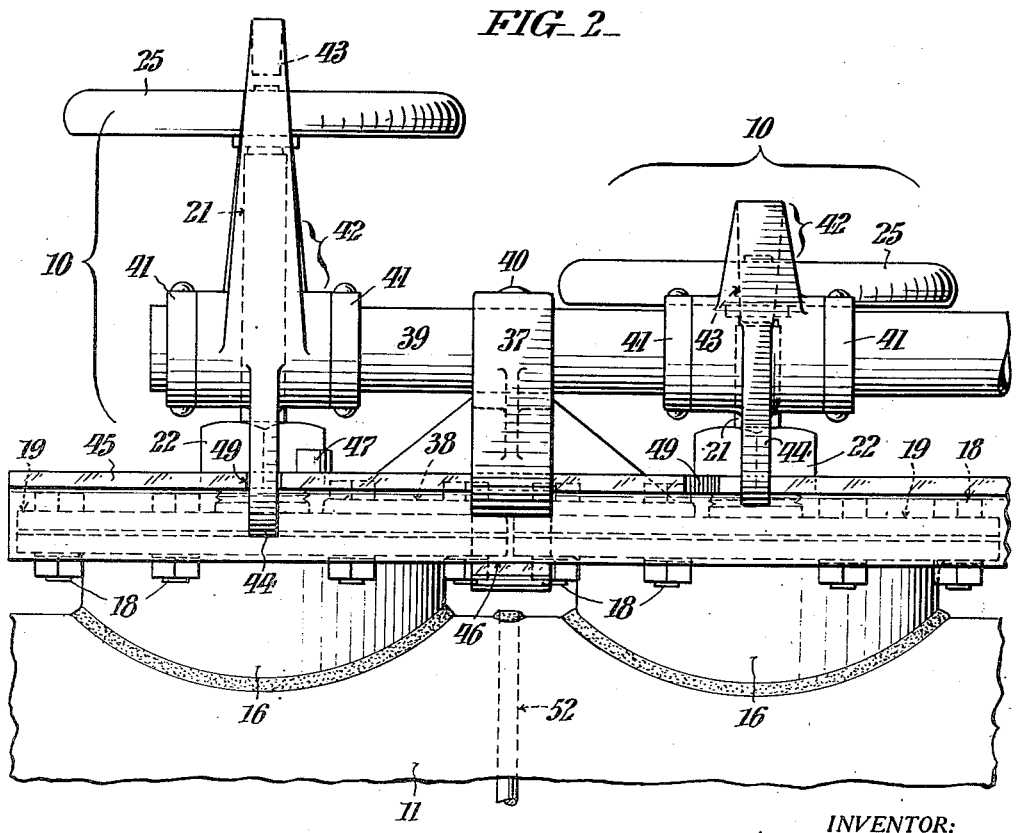
INVENTOR:
James A. Jensen,
BY
ATTORNEYS.

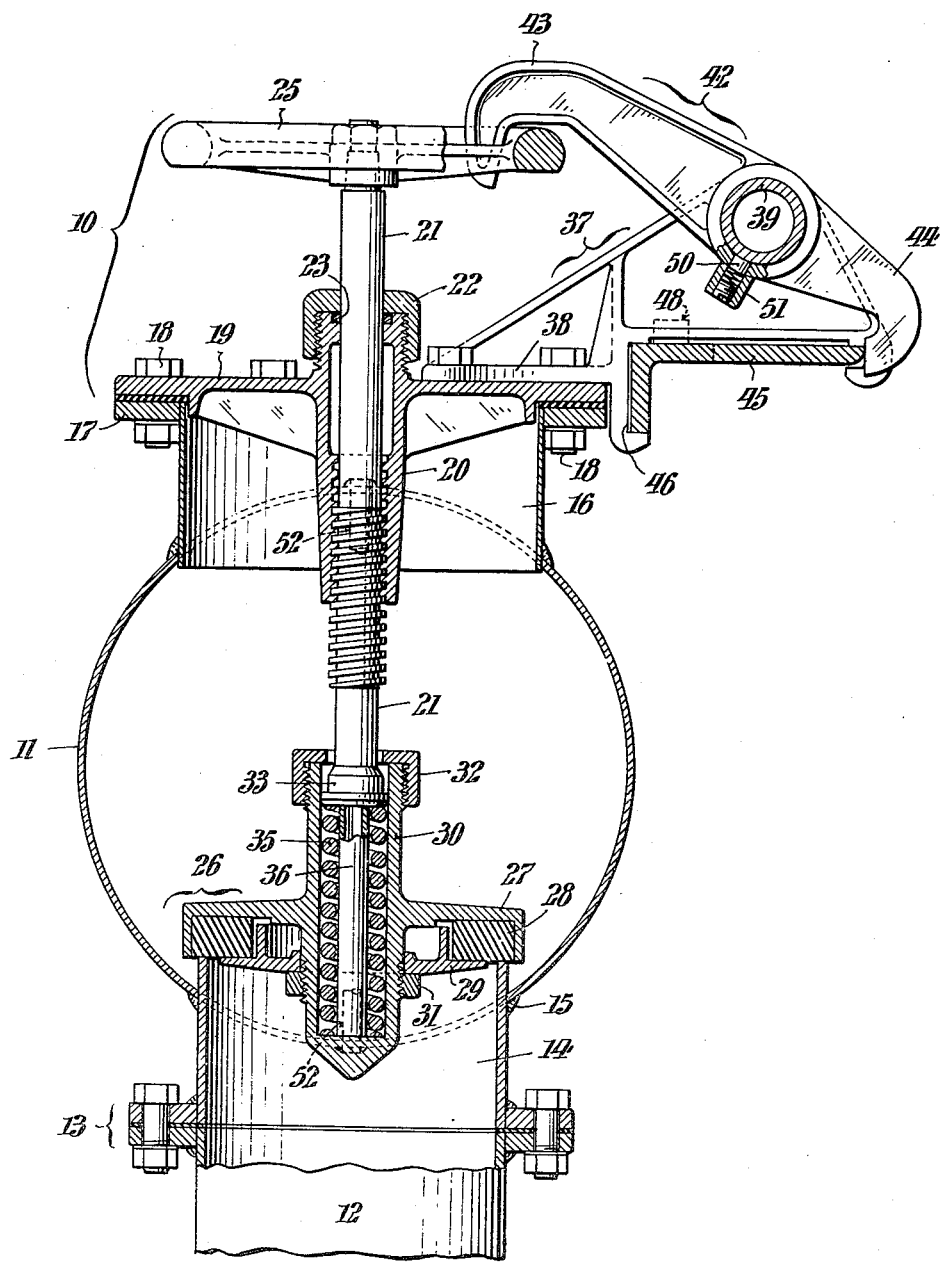

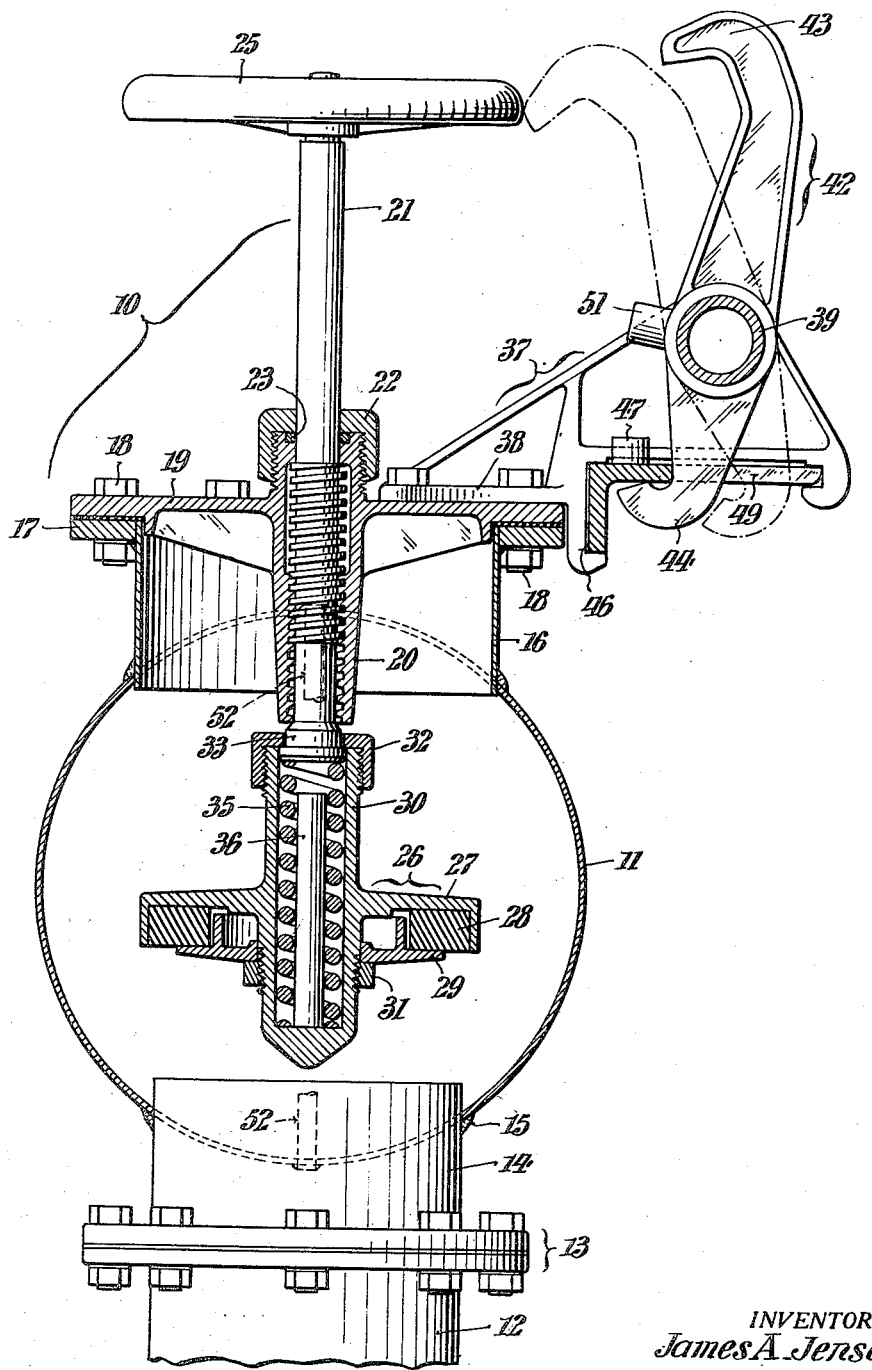

Patented Oct. 26, 1954

2,692,617

UNITED STATES PATENT OFFICE 2,692,617

SELECTIVE VALVE CONTROL MECHANISM

James A. Jensen, Haverford, Pa., assignor to Philadelphia Valve Company, Philadelphia, Pa., a corporation of Pennsylvania Application June 13, 1950, Serial No. 167,768

5 Claims. (Cl. 137—637.1)

This invention relates to selective valve control mechanism useful in instances where fluids from different supply sources are drained through a common manifold, and where it is desirable to prevent mixing of the fluids or to prevent robbing of fluids from the different sources. One example of such use is in connection with vehicles employed in the delivery of liquid commodities such as fuel oils, gasoline, etc., where the tanks are subdivided into several compartments, and where pipes, with interposed valves, lead from the individual compartments to common drain manifolds at the rear ends or at the sides of the vehicles. In most localities, the law requires that delivery vehicles of the sort referred be designed so that but one tank compartment can be drained at a time, the purpose being to prevent dishonest truck drivers from cheating by transferring some of the liquid from a filled compartment into a previously emptied or partly emptied compartment for subsequent separate disposal at a profit to themselves.

My invention has for its chief aim the provision of a simple and reliable valve control mechanism with locking means which is positive in its action and which will allow but one valve of a series to be opened at a time for drainage of fluids conducted from different sources to a common manifold and thereby prevent mixing of the fluids, or transfer of fluids from one tank section to another.

Other objects and attendant advantages will appear from the following detailed description of the attached drawings, wherein: Fig. 1 is a fragmentary view, in top plan, of a manifold with a series of interposed manually operable valves, and with selective control mechanism for the valves conveniently embodying my invention.

Fig. 2 is a fragmentary view in side elevation looking as indicated by the angled arrows II—II in Fig. 1, and drawn to a larger scale.

Figs. 3 and 4 are views in transverse section taken as indicated respectively by the angled arrows III—III and IV—IV in Fig. 1, and likewise drawn to a larger scale.

With more specific reference to these illustrations, the valves 10 to be controlled are built, at uniformly spaced intervals, into a discharge manifold 11 fashioned from sheet metal. Pipes 12 leading from different sections of a vehicle tank (not shown) or other sources of fluids are flange and bolt connected, as at 13, to sheet metal tube sections 14 of somewhat smaller diameter which project part way up into the manifold 11 from the bottom in the valve axes, and which are permanently affixed by circumferential welding as conventionally indicated at 15 about the edges of the openings provided for their reception. Integrated with the manifold 11 at the top in a like manner and in line with the tube sections 14, are similar short tube sections 16 with circumferential flanges 17 around their tops; and removably secured by bolts 18 to said flanges are bonnets 19 having bosses 20. The lower portion of the boss 20 of each bonnet 19 is internally threaded for engagement by external threads on a valve actuating spindle 21, while the upper portion of said boss is externally threaded for engagement by a gland nut 22 for retaining and compressing a packing ring indicated at 23. Each valve is operable by means of a spoked hand wheel 25 at the top of the spindle 21 to which latter is appended a closure element 26 for cooperation with the seat afforded by the top end of the tube section 14. As shown, the closure element 26 includes a disk 27 which is hollowed out for reception of a sealing ring 28 of rubber or the like. A centrally apertured retaining plate 29 fits over the pendent portion of a hollow axial boss 30 of the disk and is held in place by a backing nut 31 in threaded engagement with said boss. Threadedly engaged with the upper end of the boss 30 is a cap nut 32 whereof the inward circumferential flange loosely fits the stem 21 and overreaches a flange 33 at the bottom end of the spindle 21. Disposed within the hollow of the boss 30 and in compression between the bottom end 33 of the spindle 21 and the bottom of said hollow is a helical spring 35. Normally, the closure element 26 is firmly held to its seat, as shown in Fig. 3, through direct contact of the bottom end of the spindle with the top of an upstanding stud 36 axially within the hollow of the boss 30. It is to be noted that the stud 36 terminates short of the top of the boss 30 so that the closure will be held to its seat by the spring 35 to prevent "cracking" of the valve upon partial rotation of the hand wheel 25 when the latter is locked by my improved means about to be described.

Supported longitudinally of the manifold by fixed brackets 37 whereof the base plates 38 are secured to the bonnets 19 of adjacent valves 10 by certain of the bolts 18, is a rod 39 which is fixed against rotation in said brackets by pins 40. Medially pivoted on the rod 39 between collars 41 are locking elements 42 which have hook ends 43 to engage downwardly between adjacent spokes of the hand wheels 25, and tails 44 which normally engage the outer edge of a slide bar 45 as best shown in Fig. 3. The slide bar 45 extends longitudinally of the manifold 11 beneath the rod 39 and is constrained to endwise movement in guideways 46 at the bottoms of the outboard portions of the brackets 37, the allowable movement of said slide being determined by engagement of stop studs 47 and 48 thereon with the respective brackets in a manner which will be readily understood from Fig. 1. For a purpose presently explained, the slide bar 45 is provided with notches 49 which are evenly spaced but by a greater distance than the spacing of the valve centers.

In order to yieldingly hold the locking elements 42 in retracted position as in full lines in Fig. 4, each of them is provided with a spring-pressed shoe 50 (Fig. 3), which is disposed within a radial boss 51 on the fulcrum hub of such element, and which bears frictionally upon the rod 39. As shown, the manifold 11 is reinforced internally by upright diametral tie rods 52 centrally of the intervals between the valves 10 and beyond the endmost valves of the series for resistivity to distortion as the valves are forced to closed position by the screw action of their spindles 21. This construction makes possible the use of tubing which is relatively thin and light in weight.

Operation

With the slide bar 45 moved slightly to the right as indicated in dash and dot lines in Fig. 1, the notches 49 in said bar will all be out of registry with the tails 44 of the elements 42 and the valves all locked by engagement of the hook ends 44 of said elements as instanced in full lines in Fig. 3. By shifting the bar 45 leftward to the position shown in full lines in Fig. 1 as far as permitted by the stop lug 48, the first of the notches 49 in said bar will be in registry with the tail 44 of the locking element 42 associated with the corresponding valve 10. Accordingly, this particular locking element 42 can be retracted to the full line position of Fig. 4 to release the hand wheel 25 of the first valve which can thus be opened, the retractive movement of said element being limited by engagement of its tail end 44 with the underside of the slide 45. By shifting the bar 45 stepwise to the right from the full line position of Fig. 1, the other notches 49 can be brought successively into registry with the tails 43 of the remaining locking elements 42 to individually release the remaining valves for operation. Now since the notches 49 in the bar 45 are spaced differently from the valve centers, it will be evident, that only one valve can be released for operation at a time. Moreover, when the elements 42 are in lock position, none of the valve can be "cracked" since in the event of lost motion between the wheels and the hook ends of said elements due to the spacing of the wheel spokes, such lost motion will be compensated for by the action of the springs 35 which will hold the closures 26 to their seats, substantial axial movement of the valve spindles being provided for as will be seen from Fig. 3, before the flanges 33 on said stems encounter the cap nuts 33 to lift the closures. It will be further noted from Fig. 4 that the retracted element 42, by reason of the engagement of its tail 44 in the notch 49 of slide bar 45, locks said bar against being shifted as long as the corresponding valve 10 is open, the hand wheel 25 of the latter acting as an obstruction to limit the inward swing of said element as indicated in dash and dot lines. Mixing of the liquids conducted to the manifold by way of the several pipes or robbing as between the different supply sources of the liquids is accordingly impossible with the control mechanism of my invention.

Having thus described my invention, I claim:

1. Selective control mechanism for multiple hand wheel-operable screw spindle valves interposed side by side in a manifold at the junctures with the latter of as many pipes leading respectively from different fluid supply sources, said mechanism including a slide bar constrained to endwise movement longitudinally of the valves in fixed guides externally of the manifold and having notches in one edge thereof differently spaced from the spacing of the valves; and medially pivoted stop elements in the form of levers with tails normally engaged by the edge of the bar in the intervals between the notches, and with hook ends normally engaged between adjacent spokes of the hand wheels of the respective valves, said elements being retractable only when their tails are cleared upon registry with the respective notches in said bar as said bar is variantly shifted.

2. Selective valve control mechanism according to claim 1, wherein the locking elements are mounted for independent pivotal movement on a rod extending longitudinally of the manifold and supported by brackets secured to said manifold.

3. Selective valve mechanism according to claim 1, further including friction means for yieldingly maintaining the individual locking elements either in locked or retracted position.

4. Selective valve control mechanism according to claim 1, wherein the closure element of each valve is connected to its spindle with interposition of compression spring means to prevent unseating of said element upon partial rotation of the spindle by an amount equal to the play between the hook end of the corresponding locking elements and adjacent spokes of the hand wheel.

5. Selective valve control mechanism, according to claim 1, wherein the slide bar is guided for endwise movement in a plurality of fixed spaced brackets; and wherein the movement of said bar is limited by projections thereon adapted to respectively engage with certain of the brackets.

References Cited in the file of this patent

UNITED STATES PATENTS

| Number | Name | Date |
|---|---|---|
| 860,595 | Curtis | July 16, 1907 |
| 2,098,682 | Ward | Nov. 9, 1927 |
| 2,463,737 | Berck | Mar. 8, 1949 |

FOREIGN PATENTS

| Number | Country | Date |
|---|---|---|
| 80,715 | Austria | 1920 |
| 360,620 | Great Britain | Nov. 12, 1931 |
| 490,266 | Great Britain | 1938 |